(12) United States Patent
Streicher et al.

(10) Patent No.: US 7,341,659 B2
(45) Date of Patent: Mar. 11, 2008

(54) RINSING LIQUID TREATMENT DEVICE

(75) Inventors: Harald Streicher, Pürgen-Stoffen (DE); Franz Wenzl, Augsburg (DE); Peter Ostermeier, Diessen (DE)

(73) Assignee: Hilti Aktiengesellschaft, Schaan (LI)

( * ) Notice: Subject to any disclaimer, the term of this patent is extended or adjusted under 35 U.S.C. 154(b) by 429 days.

(21) Appl. No.: 11/202,822

(22) Filed: Aug. 11, 2005

(65) Prior Publication Data

US 2005/0269131 A1    Dec. 8, 2005

Related U.S. Application Data

(63) Continuation of application No. 10/628,169, filed on Jul. 28, 2003, now abandoned.

(30) Foreign Application Priority Data

Jul. 29, 2002   (DE) ................. 102 34 407

(51) Int. Cl.
*B28D 7/02* (2006.01)
*F16L 25/00* (2006.01)
*E21B 7/00* (2006.01)
*A47L 7/02* (2006.01)

(52) U.S. Cl. .............. 210/167.01; 210/184; 210/416.1; 15/320; 285/425

(58) Field of Classification Search .......... 210/167.01, 210/175, 184, 416.1; 285/425; 15/207, 15/320

See application file for complete search history.

(56) References Cited

U.S. PATENT DOCUMENTS

| | | | | | |
|---|---|---|---|---|---|
| 2,425,848 | A | * | 8/1947 | Vawter | 210/167.31 |
| 4,702,827 | A | * | 10/1987 | Wenzel | 210/117 |
| 5,417,851 | A | * | 5/1995 | Yee | 210/167.01 |
| 5,702,607 | A | * | 12/1997 | Lawson | 210/663 |
| 6,126,833 | A | * | 10/2000 | Stobbe et al. | 210/650 |
| 6,206,621 | B1 | * | 3/2001 | Sebring | 409/137 |
| 6,706,173 | B1 | * | 3/2004 | Heumann | 210/167.01 |
| 6,712,162 | B2 | * | 3/2004 | Britz | 175/210 |
| 2003/0116354 | A1 | * | 6/2003 | Yamashita | 175/17 |

FOREIGN PATENT DOCUMENTS

| | | | |
|---|---|---|---|
| DE | 19703911 | * | 8/1998 |
| DE | 20110223 | * | 8/2003 |
| EP | 0941828 | * | 9/1999 |
| EP | 1193026 | * | 4/2002 |
| JP | 6-170835 | * | 6/1994 |
| JP | P2001-138117 | * | 5/2001 |

* cited by examiner

*Primary Examiner*—Fred G. Prince
(74) *Attorney, Agent, or Firm*—Abelman, Frayne & Schwab

(57) ABSTRACT

A modular assembly for a rinsing liquid treatment device (2) includes an expansion module (12) and an adapter module (9) for a rinsing liquid circuit for a rock working tool (1) and having a feed line (3), a catch trough (4), a transport element (5), and an outflow (6), with the catch trough (4) being located inside a wet suction device (7).

11 Claims, 2 Drawing Sheets

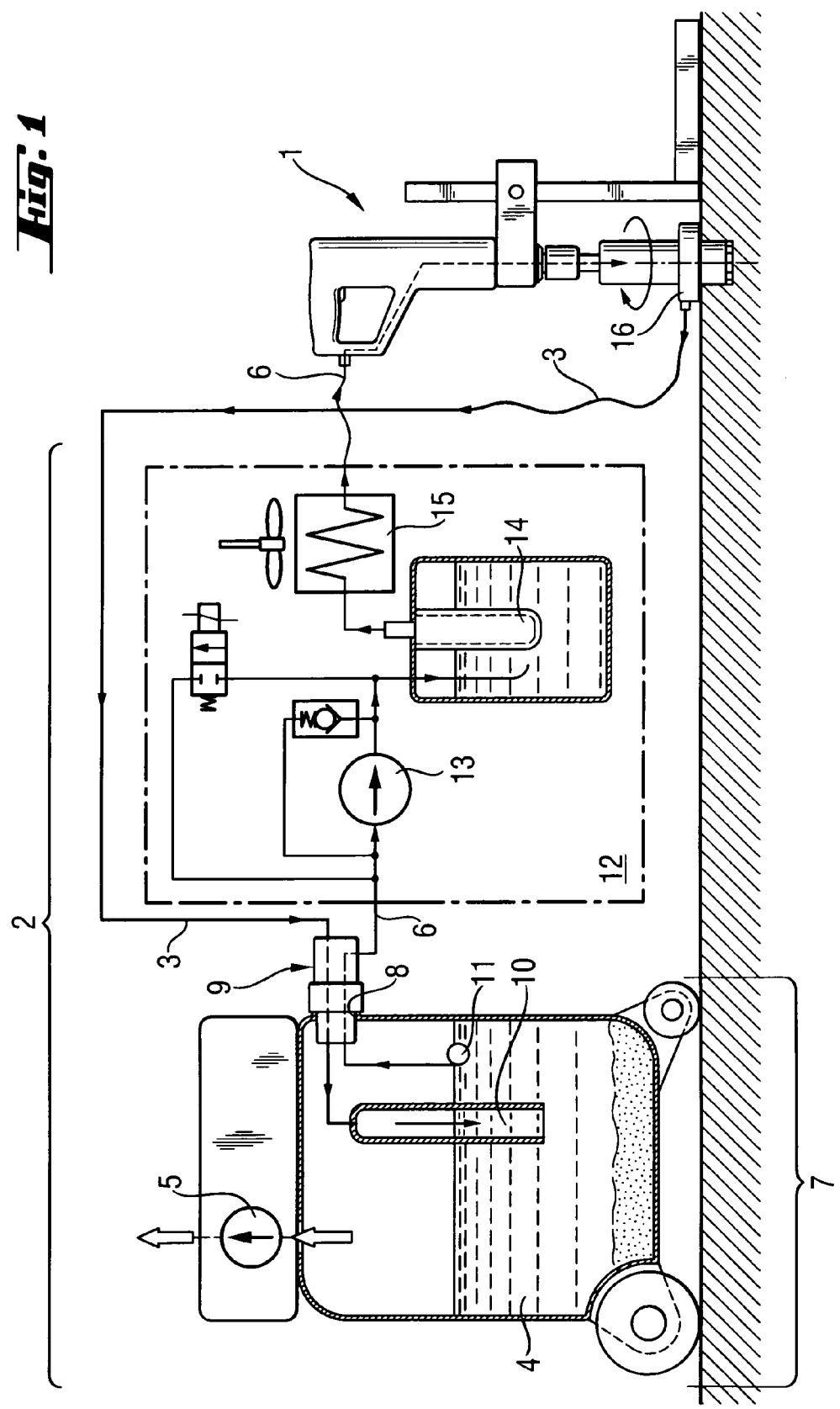

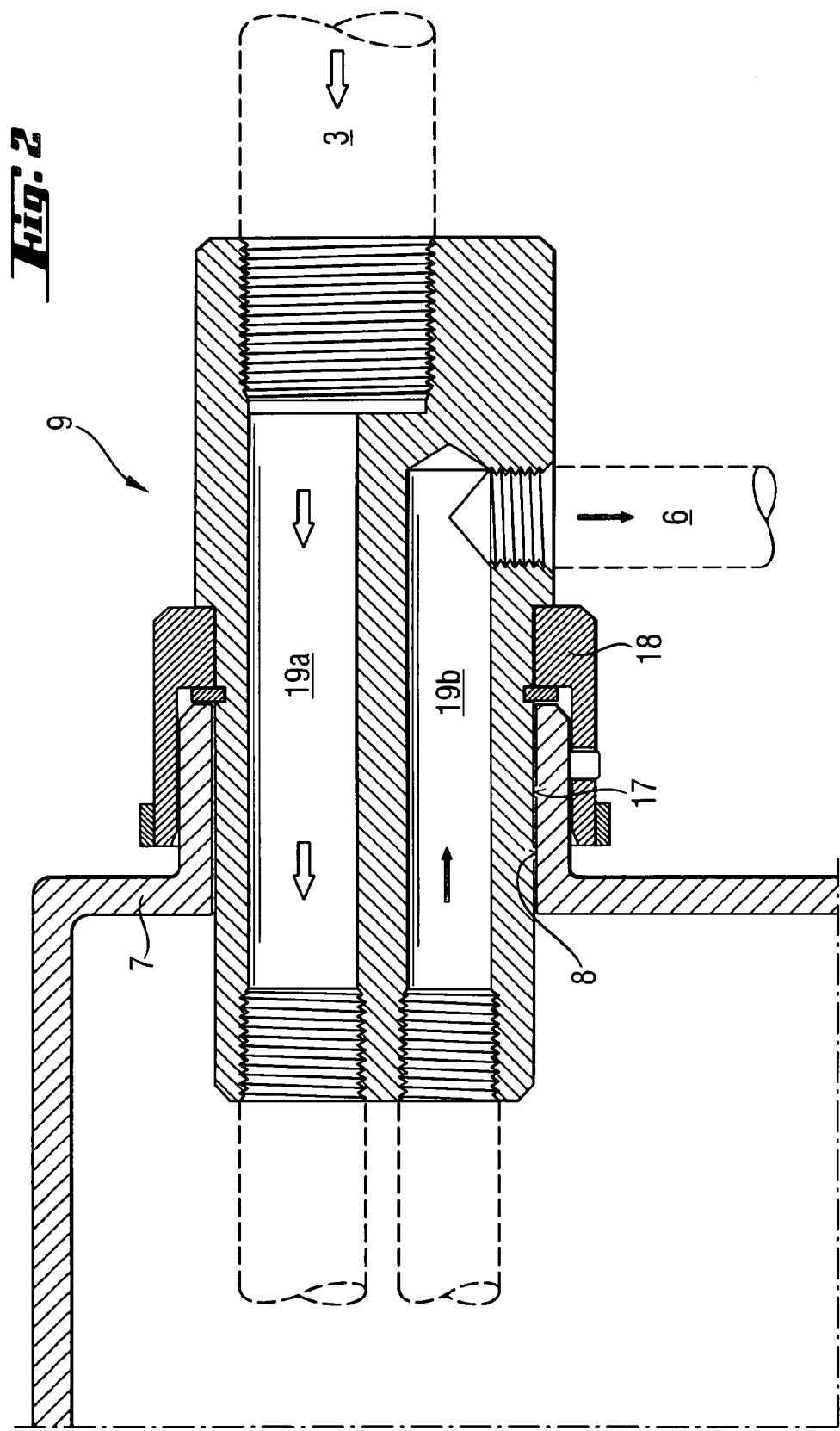

RINSING LIQUID TREATMENT DEVICE

RELATED APPLICATIONS

This application is a continuation of application Ser. No. 10/628,169 filed Jul. 28, 2003 now abandoned.

BACKGROUND OF THE INVENTION

The invention relates to a rinsing liquid treatment device for cleaning a rinsing liquid which flushes a rock working tool in a substantially closed circuit.

In particular in diamond core boring or diamond sawing of concrete, large quantities of rinse water are required that cool the drill bit or the saw blade and carry away the concrete slurry.

According to DE 19 703 911 a drill bit comprises a suction ring with a connection for a conventional wet/dry suction device. An essentially closed circulation system for the rinsing liquid is not embodied, wherein a water network must be locally available. In addition, because of the water consumption, this solution is economically feasible only for smaller, occasional drilling.

According to DE 3 545 328, a rinsing liquid treatment device comprises, in the closed circuit of the rinsing liquid, a rock working tool, in the direction of flow a feed line, a catch trough, a filter unit, a pump and an outflow opening. A rinsing liquid treatment device of this type designed as a single unit is relatively space-consuming and heavy, whereby it is relatively cumbersome to transport in the construction and allied trades.

SUMMARY OF THE INVENTION

The object of the invention is to provide an embodiment of a rinsing liquid treatment device that is as uncomplicated as possible for an essentially closed circulation of a rock working tool. A further aspect relates to the reduction of its weight.

This object is substantially achieved by a rinsing liquid treatment device that can be used in a closed circulation of the rinsing liquid with a rock working tool comprising, in the flow circuit, a feed line, a catch trough, a transport means and an outflow, wherein the catch trough is configured inside a conventional wet suction device.

Since the catch trough is configured inside a conventional wet suction device an utilizes its pressure-tight liquid collection container and the suction unit, the rinsing liquid treatment devices can be assemble modularly from the wet suction device and an expansion module conventional in the construction and allied trades. Both modules, being smaller and lighter, are easier to transport.

Essentially, an adapter module for expanding a conventional wet suction device by an expansion module into a rinsing fluid treatment device comprising, in the flow circuit, a feed line, a catch trough, a transport means and an outflow, has an appropriate pressure tight external sealing surface for the suction opening of the wet suction device and a bi-directional passage for the flow circuit to and from the catch trough.

By virtue of the bi-directional passage for the flow circuit to and from the catch trough, the catch trough can be configured inside a conventional wet suction device, whereby the conversion of the wet suction device is accomplished by simple introduction of the adapter module into the suction opening of the wet suction device.

The adapter module is advantageously connected on the suction connection side at the end of the feed line using a tubular collector means, wherein the rinsing liquid contaminated by sediment exits from the feed line smoothly and beneath the surface of the liquid.

The adapter module is advantageously connected on the suction connection side at the end of the outflow using a floating suction means, wherein coarsely purified rinsing liquid that is liberated of sediment that settles to the bottom reaches the vicinity of the surface of the liquid in the outflow.

Advantageously, the adapter module comprises two passages that are pressure tight separated from each other running in sealed cross-section, whereby the feed line and the outflow are alongside each other by simple hoses.

Advantageously, the adapter module on the hose connection side via the outflow, preferably configures as a flexible pressure hose, using the expansion module, whereby both modules can be disposed flexibly limited relative to each other.

Advantageously, the adapter module can be connected, on the hose connection side, via the feed line, preferably as a flexible pressure hose, directly to the catching means of the rock working tool as a suction ring, wherein no unnecessary pressure loss occurs in the fed line and no sediment accumulates.

Advantageously, the expansion module comprises a pump unit in the outflow, whereby the flow of the rinsing liquid to the rock working tool can be actively supported.

Advantageously, the expansion module comprises a filter unit in the outflow, whereby the rinsing liquid can be cleansed of fine suspended particles, which could clog the rock working tool.

Advantageously, the expansion module comprises a cooling unit in the outflow, whereby the rinsing liquid heated in the flow circuit by the rock working tool can be actively cooled.

BRIEF DESCRIPTION OF THE DRAWINGS

The exemplary embodiment of the invention will be more completely described with reference the drawings wherein:

FIG. 1 shows a rinsing liquid treatment device, in accordance with the invention; and;

FIG. 2 shows an adapter module.

DETAILED DESCRIPTION OF THE INVENTION

FIG. 1 shows a rinsing liquid treatment device 2 disposed in the closed circuit of a rinsing liquid with a rock working tool 1 in the flow circuit a feed line 3 configured as a flexible pressure hose, a catch trough 4, a transport means 5 and an outflow 6 configured as a flexible pressure hose. The catch trough 4 is configured inside a conventional wet suction device 7, in that the flow circuit runs bi-directionally through the suction opening 8 of the wet suction device 7, in which an adapter module 9 is installed pressure tight. The catch trough 4 comprises a tubular catching means 10 at the end of the feed line 3 and a floating suction means 11 at the end of the outflow 6. An expansion module 12 in the outflow 6 comprises a pump unit 13, a filter unit 14 and a cooling unit 15. The adapter module 9 is, on the hose connection side, connected via the feed line 3 directly with a catching means 16 of the rock working tool 1.

According to FIG. 2, the adapter module 9 with a sealing surface 17 for the suction opening 8 of the wet suction device 7 and a fastening means 18 for rotary stop fastening to the conventional flange of the suction opening 8 comprises two passages 19a, 19b that are separated from each other pressure-tightly for the feed line 3 and the outflow 6.

Though the present invention was shown and described with references to the preferred embodiment, such are merely illustrative of the present invention and are not to be construed as a limitation thereof, and various modifications of the present invention will be apparent to those skilled in the art. It is, therefore, not intended that the present invention be limited to the disclosed embodiment or details thereof, and the present invention includes all variations and/or alternative embodiments within the spirit and scope of the present invention as defined by the appended claims.

What is claimed is:

1. A modular assembly for a rinsing liquid treatment device (2) arranged in a closed circuit of rinsing liquid with a rock working tool (1) and having a catch trough (4), a feed line (3) for feeding used rinsing liquid to the catch trough (4), and an outflow (6) for delivery of cleaned rinsing liquid to the rock working tool (1), the modular assembly comprising:
   a separated transportable wet suction device (7) in which the catch trough (4) is arranged and having a single opening (8) for communicating the catch trough (4) with the feed line (3) and the outflow (6);
   an expansion module (12) arranged in the outflow (6) and including a pump unit (13) and at least one of a filter unit (14) and a cooling unit (15); and
   an adapter module (9) receivable in the single opening (8) of the wet suction device (7) and forming an interface between the wet suction device (7) and the expansion module (12), the feed line (3) and the outflow (6) extending through the adapter module (9).

2. The modular assembly of claim 1, wherein the adapter module (9) comprises a sealing surface (17) for a bi-directional passage of a liquid flow to and from the catch trough (4).

3. The modular assembly of claim 2, wherein the bi-directional passage comprises two passage (19a, 19b) that are pressure-tight separated from each other.

4. The modular assembly of claim 1, wherein the adapter module is connectable, on the hose connection side, via the feed line (3) directly with a catch means (16) of the rock working tool (1).

5. The modular assembly of claim 1, wherein the adapter module is connected, on the suction connection side, at the end of the feed line (3), to a catch trough (10).

6. The modular assembly of claim 1, wherein the adapter module is connected, on the suction connection side, at the end of the outflow (6) to suction means (11).

7. The modular assembly of claim 5, wherein the suction means (11) floats.

8. The modular assembly of claim 1, wherein the outflow (6) is a flexible pressure hose.

9. The modular assembly of claim 1, wherein the feed line (3) is a flexible pressure hose.

10. The modular assembly of claim 1, wherein the catch trough (10) is tubular.

11. A modular assembly of claim 1, wherein the expansion module comprises both the filter unit (14) and the cooling unit (15).

* * * * *